US007999726B2

(12) United States Patent
Guertin et al.

(10) Patent No.: US 7,999,726 B2

(45) Date of Patent: Aug. 16, 2011

(54) ANTENNA POINTING BIAS ESTIMATION USING RADAR IMAGING

(75) Inventors: Ralph Guertin, Green Valley, AZ (US); David Faulkner, Tucson, AZ (US); John Treece, Tucson, AZ (US); Donald Bruyere, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 766 days.

(21) Appl. No.: 12/008,455

(22) Filed: Jan. 11, 2008

(65) Prior Publication Data

US 2010/0282894 A1 Nov. 11, 2010

(51) Int. Cl.

*G01S 7/40* (2006.01)
*G01S 13/89* (2006.01)
*G01S 13/90* (2006.01)
*F41G 7/20* (2006.01)
*G01S 7/00* (2006.01)
*G01S 13/00* (2006.01)
*F41G 7/00* (2006.01)

(52) U.S. Cl. ........... 342/173; 342/25 R; 342/27; 342/28; 342/61; 342/62; 342/63; 342/73; 342/74; 342/75; 342/80; 342/82; 342/89; 342/118; 342/134; 342/139; 342/140; 342/146; 342/147; 342/149; 342/165; 342/175; 342/176; 342/179; 342/195; 244/3.1; 244/3.15; 244/3.19

(58) Field of Classification Search .............. 342/61–65, 342/73–81, 147–158, 165–176, 179, 192–197, 342/25 R–25 F, 82–115, 118, 134, 139, 141, 342/146, 159–164, 27, 28, 140, 142–144; 244/3.1–3.3

See application file for complete search history.

(56) References Cited

U.S. PATENT DOCUMENTS

| | | | | | |
|---|---|---|---|---|---|
| 3,626,414 | A | * | 12/1971 | Valstar | 342/106 |
| 3,778,829 | A | * | 12/1973 | Longuemare et al. | 342/92 |
| 4,160,975 | A | * | 7/1979 | Steudel | 342/89 |
| 4,217,583 | A | * | 8/1980 | Hiller et al. | 342/149 |
| 4,533,916 | A | * | 8/1985 | Williams | 342/80 |
| 4,549,184 | A | * | 10/1985 | Boles et al. | 342/107 |
| 4,825,213 | A | * | 4/1989 | Smrek | 342/161 |
| 5,351,053 | A | * | 9/1994 | Wicks et al. | 342/158 |
| 5,579,011 | A | * | 11/1996 | Smrek | 342/156 |
| 5,731,783 | A | * | 3/1998 | Graham | 342/194 |
| 5,977,906 | A | * | 11/1999 | Ameen et al. | 342/174 |
| 6,480,142 | B1 | * | 11/2002 | Rubin | 342/107 |
| 7,068,215 | B2 | * | 6/2006 | Steinbauer | 342/141 |
| 7,218,272 | B2 | * | 5/2007 | Steinbauer | 342/62 |

* cited by examiner

*Primary Examiner* — Bernarr E Gregory

(74) *Attorney, Agent, or Firm* — Schwegman, Lundberg & Woessner, P.A.; Gregory J. Gorrie

(57) ABSTRACT

A system for estimating an antenna boresight direction. The novel system includes a first circuit for receiving a Doppler measurement and a line-of-sight direction measurement corresponding with the Doppler measurement, and a processor adapted to search for an estimated boresight direction that minimizes a Doppler error between the Doppler measurement and a calculated Doppler calculated from the estimated boresight direction and the line-of-sight direction measurement. The line-of-sight direction measurement is measured relative to the true antenna boresight, and the calculated Doppler is the Doppler calculated for a direction found by applying the line-of-sight direction measurement to the estimated boresight direction. In a preferred embodiment, the first circuit receives a Doppler measurement and a line-of-sight direction measurement from each of a plurality of pixels, and the processor searches for an estimated boresight direction that minimizes a sum of squares of Doppler errors for each of the pixels.

23 Claims, 4 Drawing Sheets

ANTENNA POINTING BIAS ESTIMATION USING RADAR IMAGING

BACKGROUND OF THE INVENTION

1. Field of the Invention

The present invention relates to radar systems. More specifically, the present invention relates to systems and methods for correcting for antenna gimbal biases.

2. Description of the Related Art

Guiding a missile to a target requires an accurate measurement of the target's three-dimensional location relative to the missile. Precise target location to the degree required for weapon midcourse/terminal engagement is well known for air targets but less so for ground targets where the engagement is typically based on radar seekers and imaging technology.

An imaging radar can determine the location of a ground target with the assistance of monopulse measurements that estimate the direction of each pixel in the radar image relative to the antenna boresight. An imaging radar system typically includes a radar antenna having a pointing mechanism, such as a gimbal or electronically scanned pointing, for controlling the direction in which the antenna is pointed. The pointing mechanism, however, may have unknown biases in its azimuth and elevation angles. These biases can lead to large errors in the apparent direction of the scene being imaged and, consequently, in the target location. Pointing biases vary from missile to missile and must be corrected for to ensure accurate measurements.

Factory alignment and on-aircraft target calibration can reduce gimbal biases, but these approaches are typically expensive and/or burdensome. Factory electrical alignment requires anechoic chambers that are expensive to build and maintain, since they themselves need calibration. Aircraft calibration targets also add to the cost of the aircraft, and raise maintenance costs. Neither of these options really simulates a target in the far field environment because of the limited space within which they are required to operate. Also, vibration from transportation or aircraft environments can introduce additional mechanical biases after the total initial biases, both electrical and mechanical, have been removed through calibration.

Hence, a need exists in the art for an improved system or method for correcting for antenna pointing biases that is less expensive and more accurate than prior approaches.

SUMMARY OF THE INVENTION

The need in the art is addressed by the system and method for estimating an antenna boresight direction of the present invention. The novel system includes a first circuit for receiving a Doppler measurement and a line-of-sight direction measurement corresponding with the Doppler measurement, and a processor adapted to search for an estimated boresight direction that minimizes a Doppler error between the Doppler measurement and a calculated Doppler calculated from the estimated boresight direction and the line-of-sight direction measurement. The line-of-sight direction measurement is measured relative to the true antenna boresight pointing direction, and the calculated Doppler is the Doppler calculated for a direction found by applying the line-of-sight direction measurement to the estimated boresight direction. In a preferred embodiment, the first circuit receives a Doppler measurement and a line-of-sight direction measurement from each of a plurality of pixels, and the processor searches for an estimated boresight direction that minimizes a sum of squares of Doppler errors for each of the pixels.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
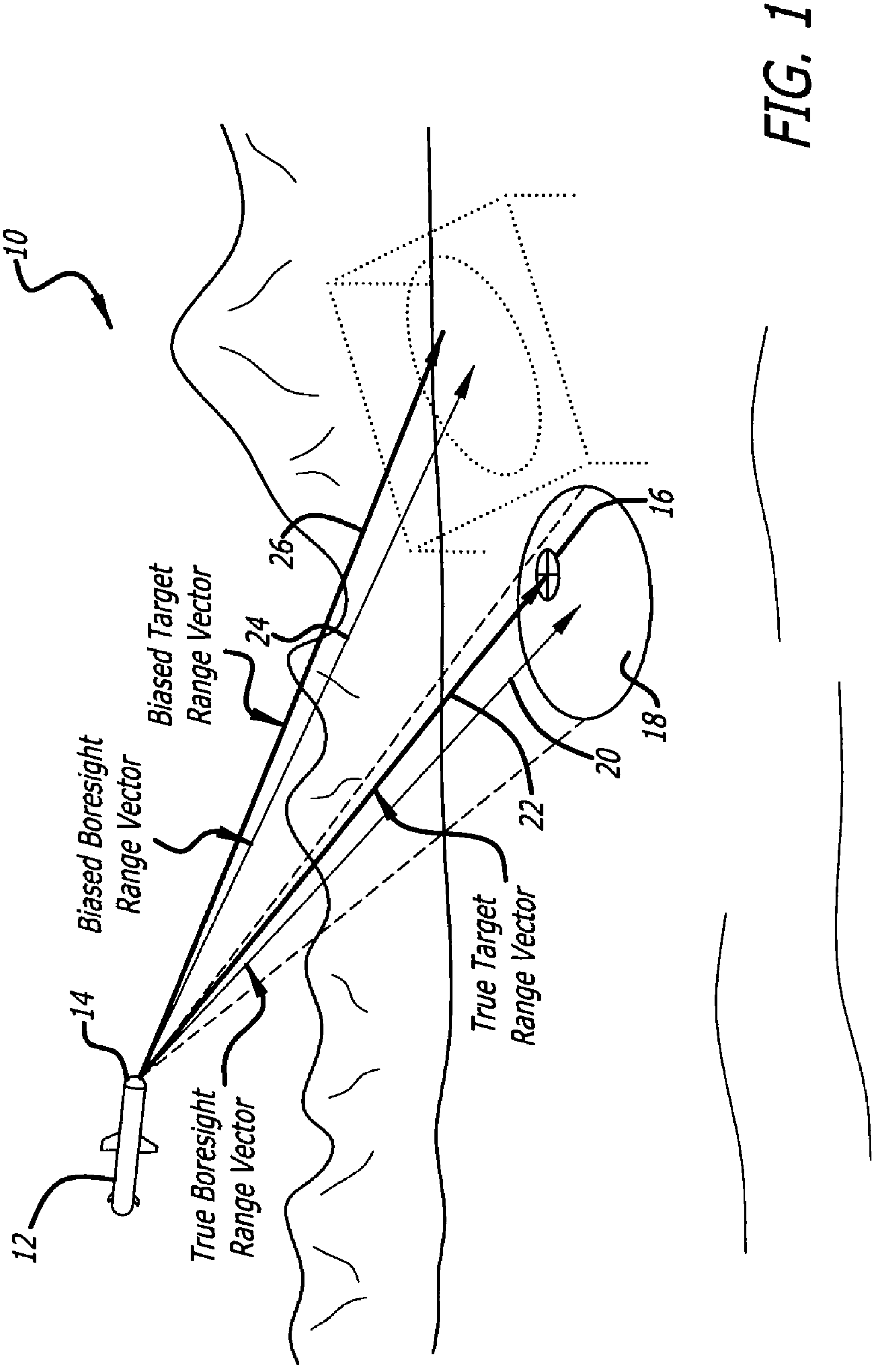
FIG. 1 is a simplified diagram of an illustrative scenario showing the problem addressed by the present invention.

FIG. 1 is a simplified diagram of an illustrative scenario 10 showing the problem addressed by the present invention. A missile 12 is equipped with an imaging radar seeker 14 that uses radar measurements to guide the missile 12 toward a target 16. The imaging radar, which may be, for example, a synthetic aperture radar (SAR) or Doppler beam sharpening (DBS) system, transmits electromagnetic energy toward the target area 18 and uses the reflected return signals to form an image comprised of several pixels corresponding to range-Doppler bins.

Weapons applications typically use a monopulse radar system that—in addition to range and Doppler measurements—also measures the direction (monopulse azimuth and elevation angles) of each image pixel relative to the radar antenna boresight (represented by the antenna boresight range vector 20 in FIG. 1). The monopulse angles of the pixel containing the target 16 can therefore be used to determine the precise location of the target 16 relative to the missile 12 (represented by the target range vector 22 in FIG. 1), if the precise heading of the antenna boresight 20 is known.

If, however, the missile's measurements of the antenna boresight 20 are incorrect due to unknown biases in the antenna gimbal (or other antenna pointing mechanism), the missile guidance system will compute an incorrect target location, potentially causing the missile to miss the target 16. As shown in FIG. 1, antenna gimbal measurements mistakenly indicate that the antenna is pointed in the direction of a measured (biased) boresight range vector 24. The missile guidance system therefore computes the target location by applying the measured monopulse angles of the target pixel to the biased boresight range vector 24 (instead of the true antenna boresight vector 20), causing the missile to erroneously believe that the target location is given by a biased target range vector 26.

The present invention addresses this problem by providing a novel method for estimating the true antenna gimbal boresight direction, allowing for a more accurate calculation of the target location. Instead of (or in addition to) correcting for gimbal biases during factory alignment or on-aircraft calibration, the gimbal biases are estimated and corrected for during operation (e.g., during missile flight). In accordance with the present teachings, the gimbal biases are estimated by exploiting the mismatch between the measured Doppler and what the Doppler would be if it was coming from the biased antenna direction.

Figure 2:
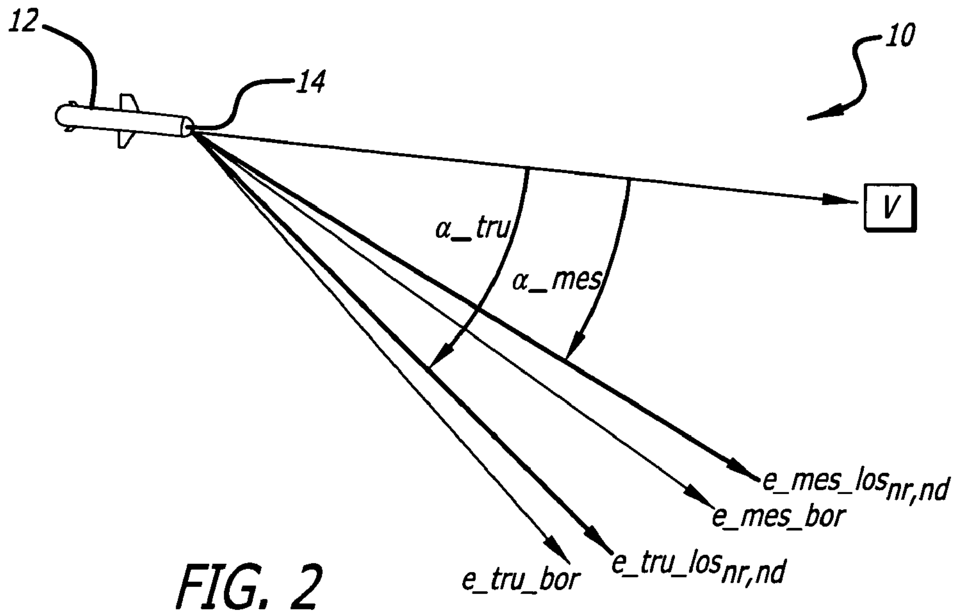
FIG. 2 is a simplified diagram of the illustrative scenario of FIG. 1, showing the parameters used in the discussion of the present invention.

FIG. 2 is a simplified diagram of the illustrative scenario 10 of FIG. 1, showing the parameters used in the following discussion. The missile 12—and therefore the radar antenna and gimbal onboard the missile 12—are traveling at a missile velocity V, and the radar antenna/gimbal is pointed toward e_tru_bor, a unit vector in the direction of the antenna boresight. The radar measures a range, Doppler, and monopulse direction angles for each pixel (nr, nd) in the radar image, where nr is a range index and nd is a Doppler index.

The monopulse line-of-sight (LOS) vector $e\_tru\_los_{nr,nd}$ is a unit vector pointing from the center of the radar antenna toward the three-dimensional location corresponding to a particular pixel (nr, nd). The missile radar measures a monopulse azimuth angle $\theta\_mes\_mon_{nr,nd}$ and a monopulse elevation angle $\phi\_mes\_mon_{nr,nd}$ from this location. The monopulse angle measurements are found relative to the boresight direction e_tru_bor. The precise location corresponding to pixel (nr, nd) can therefore be found by applying the range and monopulse angle measurements from that pixel to the antenna boresight e_tru_bor.

The true antenna boresight e_tru_bor, however, is unknown. The missile believes the antenna is pointed in the direction of a measured boresight vector e_mes_bor, given by the missile's biased gimbal measurements. The missile therefore believes that the monopulse measurements originated from a biased monopulse LOS vector $e\_mes\_los_{nr,nd}$ found by applying the monopulse angle measurements $\theta\_mes\_mon_{nr,nd}$ and $\phi\_mes\_mon_{nr,nd}$ to the biased boresight vector e_mes_bor. Thus, if the measured antenna boresight e_mes_bor is not equal to the true antenna boresight e_tru_bor, then the measured monopulse LOS $e\_mes\_los_{nr,nd}$ will not be equal to the true monopulse LOS $e\_tru\_los_{nr,nd}$.

In accordance with the present teachings, this error can be reduced by looking at the Doppler associated with the pixel (nr, nd). The Doppler $f\_dop_{nr,nd}$ from a particular pixel (nr, nd) should be equal to twice the component of the missile velocity V along the LOS vector from the radar antenna to the location of the pixel, divided by the wavelength λ of the transmitted signal. A Doppler originating from the true LOS $e\_tru\_los_{nr,nd}$ (having a Doppler angle α_tru) will therefore be different from a Doppler originating from the biased LOS (having a different Doppler angle α_mes).

The Doppler $f\_dop_{nr,nd}$ coming from $e\_tru\_los_{nr,nd}$ measured by the missile radar for pixel (nr, nd) is equal to:

$$f\_dop_{nr,nd} = \frac{2}{\lambda} \boldsymbol{V} \cdot \mathbf{e\_tru\_los}_{nr,nd} \quad [1]$$

However, if the Doppler had originated from the direction of the biased monopulse LOS $e\_mes\_los_{nr,nd}$, then the Doppler would have been equal to:

$$f\_dop\_bias_{nr,nd} = \frac{2}{\lambda} \boldsymbol{V} \cdot \mathbf{e\_mes\_los}_{nr,nd} \quad [2]$$

Thus, if the measured antenna boresight e_mes_bor is not equal to the true antenna boresight e_tru_bor, the measured monopulse LOS $e\_mes\_los_{nr,nd}$ will not be equal to the true monopulse LOS $e\_tru\_los_{nr,nd}$, and the measured Doppler $f\_dop_{nr,nd}$ will not be equal to the Doppler calculated for the biased LOS $e\_mes\_los_{,nd}$. This mismatch can be exploited to find a better estimate for the true antenna boresight e_tru_bor.

The difference between the measured Doppler $f\_dop_{nr,nd}$ and the Doppler $f\_dop\_bias_{nr,nd}$ calculated for the biased LOS $e\_mes\_los_{,nd}$ is defined as the Doppler error $\Delta f\_dop_{nr,nd}$ for pixel (nr, nd):

$$\Delta f\_dop_{nr,nd} = f\_dop_{nr,nd} - \frac{2}{\lambda} \boldsymbol{V} \cdot \mathbf{e\_mes\_los}_{nr,nd} \quad [3]$$

In accordance with the present teachings, an estimate for the true antenna boresight e_tru_bor is found by minimizing the sum of the squares of the Doppler error $\Delta f\_dop_{nr,nd}$ for all of the monopulse look directions, i.e., for every pixel (nr, nd) in the radar image. This is accomplished by performing a numerical search for the "best" gimbal azimuth and elevation angles, using the biased gimbal measurement as the initial guess.

Figure 3:
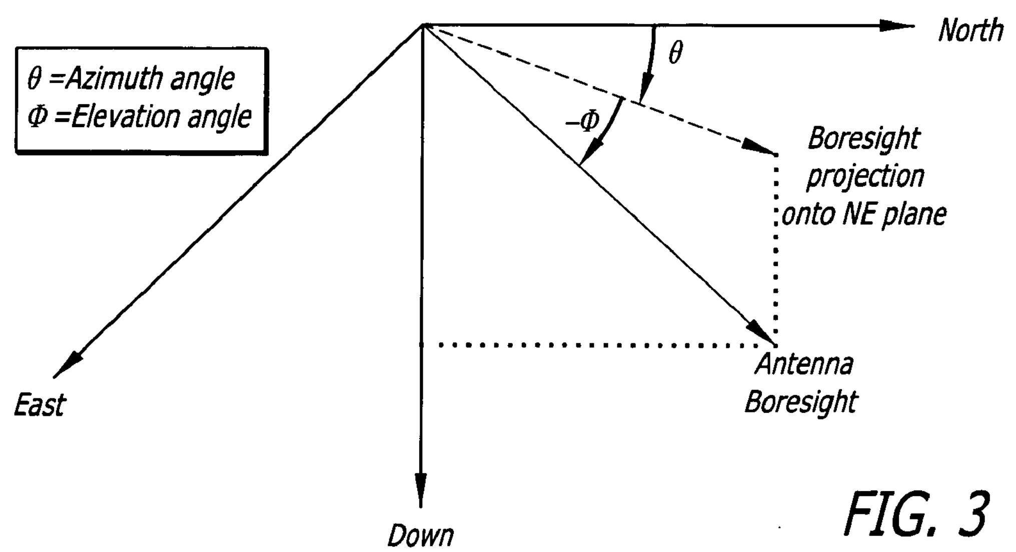
FIG. 3 is a simplified diagram defining the gimbal angles of an illustrative antenna boresight vector in a NED (north-east-down) coordinate system.

FIG. 3 is a simplified diagram defining the gimbal angles of an illustrative antenna boresight vector in an NED (north-east-down) coordinate system. The antenna coordinate system (of the monopulse direction measurements and gimbal angle measurements) uses azimuth and elevation angles. The azimuth angle θ is the angle between north and the projection of the antenna boresight onto the NE plane. The elevation angle ϕ is the angle between the NE plane and the antenna boresight vector. Antenna boresight coordinates in an NED frame are therefore given by:

$$\begin{bmatrix} \cos\theta\cos\varphi \\ \sin\theta\cos\varphi \\ -\sin\varphi \end{bmatrix} \quad [4]$$

The true antenna gimbal boresight angles are defined as θ_tru_ant (the true gimbal azimuth angle) and ϕ_tru_ant (the true gimbal elevation angle). The measured (biased) antenna gimbal boresight angles are defined as θ_mes_ant (the biased gimbal azimuth angle) and ϕ_mes_ant (the biased gimbal elevation angle). Assuming that the measured gimbal angles are biased by fixed biases (i.e., the biases do not change depending on the direction in which the gimbal is pointed), the measured gimbal angles are given by:

$$\theta\_mes\_ant = \theta\_tru\_ant - \delta\theta\_ant \quad [5]$$

$$\phi\_mes\_ant = \phi\_tru\_ant - \delta\phi\_ant \quad [6]$$

where δθ_ant is an unknown azimuth angle bias and δϕ_ant is an unknown elevation angle bias.

The true gimbal angles θ_tru_ant and ϕ_tru_ant are unknown. The present invention searches for "good" estimates of the true gimbal angles: θ_est_ant (estimated gimbal azimuth angle) and ϕ_est_ant (estimated gimbal elevation angle).

The missile radar measures monopulse direction angles for each pixel of the image. The true monopulse angles for pixel (nr, nd) are defined as $\theta\_tru\_mon_{nr,nd}$ (true monopulse azimuth angle) and $\phi\_tru\_mon_{nr,nd}$ (true monopulse elevation angle). The actual measured monopulse angles (as measured by the missile radar) may include small random errors, so the measured monopulse angles $\theta\_mes\_mon_{nr,nd}$ (measured monopulse azimuth angle) and $\phi\_mes\_mon_{nr,nd}$ (measured monopulse elevation angle) are modeled as:

$$\theta\_mes\_mon_{nr,nd} = \theta\_tru\_mon_{nr,nd} + \mu_{nr,nd} \quad [7]$$

$$\phi\_mes\_mon_{nr,nd} = \phi tru\_mon_{nr,nd} + \nu_{nr,nd} \quad [8]$$

where $\mu_{nr,nd}$ and $\nu_{nr,nd}$ are assumed to be random errors (Gaussian) having zero mean and standard deviation $\sigma_{man}$. The measured monopulse angles are found relative to the true antenna boresight direction. The measured monopulse direction vector $e\_mes\_mon_{nr,nd}$, which is a unit vector pointing toward the monopulse LOS relative to the true antenna boresight, is found from these angles.

$$e\_mes\_mon_{nr,nd} = \begin{bmatrix} a \\ a\tan(\theta\_mes\_mon_{nr,nd}) \\ -a\tan(\varphi\_mes\_mon_{nr,nd}) \end{bmatrix} \quad [9]$$

where $$a = \frac{1}{\sqrt{1 + \tan(\theta\_mes\_mon_{nr,nd})^2 + \tan(\varphi\_mes\_mon_{nr,nd})^2}}.$$

Since the measured monopulse direction vector $e\_mes\_mon_{nr,nd}$ is relative to the antenna boresight, it is applied to the antenna boresight angles to obtain the monopulse LOS direction in the NED frame. Rotation from antenna coordinates to NED coordinates can be achieved by applying a rotation matrix $Rot_{zy}(\theta, \phi)$:

$$\boldsymbol{Rot}_{zy}(\theta, \varphi) = \begin{bmatrix} \cos\theta & -\sin\theta & 0 \\ \sin\theta & \cos\theta & 0 \\ 0 & 0 & 1 \end{bmatrix} \begin{bmatrix} \cos\varphi & 0 & \sin\varphi \\ 0 & 1 & 0 \\ -\sin\varphi & 0 & \cos\varphi \end{bmatrix} \quad [10]$$

The true monopulse look direction $e\_tru\_los_{nr,nd}$ in the NED frame is therefore given by:

$$e\_tru\_los_{nr,nd} = Rot_{zy}(\theta\_tru\_ant, \phi\_tru\_ant)\, e\_tru\_mon_{nr,nd} \quad [11]$$

where $e\_tru\_mon_{nr,nd}$ is the true monopulse direction vector formed from the true monopulse angles $\theta\_tru\_mon_{nr,nd}$ and $\phi\_tru\_mon_{nr,nd}$. (This value is unknown.)

The measured monopulse look direction $e\_mes\_los_{nr,nd}$ in the NED frame (including the effects of both gimbal biases and random errors in the monopulse angle measurements) is given by:

$$e\_mes\_los_{nr,nd} = Rot_{zy}(\theta\_mes\_ant, \phi\_mes\_ant)\, e\_mes\_mon_{nr,nd} \quad [12]$$

In accordance with the present teachings, an estimate for the true gimbal angles is found by calculating the total error Error(θ_ant, ϕ_ant) corresponding to arbitrary gimbal angles (θ_ant, ϕ_ant), and searching for the best gimbal angles (θ_ant, ϕ_ant) that minimize the total error Error(θ_ant, ϕ_ant).

The total error Error(θ_ant, ϕ_ant) is defined as the sum of the squares of the Doppler errors Δf_dop_gen(θ_ant, ϕ_ant) for each monopulse look direction (nr, nd):

$$\text{Error}(\theta\_ant, \varphi\_ant) = \sum_{nr=1}^{N_{rad}} \sum_{nd=1}^{N_{dop}} [\Delta f\_dop\_gen(\theta\_ant, \varphi\_ant)]^2 = \sum_{nr=1}^{N_{rad}} \sum_{nd=1}^{N_{dop}} \left[ f\_dop_{nr,nd} - \frac{2}{\lambda} \boldsymbol{V} \cdot \boldsymbol{Rot}_{zy}(\theta\_ant, \varphi\_ant) \boldsymbol{e\_mes\_mon}_{nr,nd} \right]^2 \quad [13]$$

where $N_{rad}$ is the number of range bins, $N_{dop}$ is the number of Doppler bins in the image, and $\Delta f\_dop\_gen(\theta\_ant, \varphi\_ant) = f\_dop_{nr,nd} - \frac{2}{\lambda} \boldsymbol{V} \cdot \boldsymbol{Rot}_{zy}(\theta\_ant, \phi\_ant) e\_mes\_mon_{nr,nd}$. (Note that the Doppler error Δf_dop_gen(θ_ant, ϕ_ant) is a generalization of the Doppler error defined by Eqns. 3 and 12, and is equal to it when θ_ant=θ_mes_ant and ϕ_ant=ϕ_mes_ant.) The Doppler $f\_dop_{nr,nd}$ and monopulse direction vector $e\_mes\_mon_{nr,nd}$ for each pixel (nr, nd) are measured by the missile radar. The missile velocity V can be measured by an inertial measurement unit (IMU) onboard the missile, and the transmitted signal wavelength λ is known.

A numerical search is used to find the best gimbal angles (θ_ant, ϕ_ant) that minimize the total Doppler error Error (θ_ant, ϕ_ant), starting with initial guess values equal to the measured gimbal angles (θ_ant=θ_mes_ant, ϕ_ant=ϕ_mes_ant). There is a well-defined minimum to which the solution converges rapidly, allowing this technique to be implemented in real time. Several numerical search algorithms are known in the art, for example, a Levenberg-Marquardt algorithm can be used to perform the search. Other search algorithms can also be used without departing from the scope of the present teachings.

The gimbal angles (θ_ant, ϕ_ant) at which the minimum occurs are designated the estimated gimbal angles (θ_est_ant, ϕ_est_ant). The estimated gimbal biases (δθ_est_ant, δϕ_est_ant) can be found by subtracting the measured gimbal angles (θ_mes_ant, ϕ_mes_ant) from the estimated gimbal angles (θ_est_ant, ϕ_est_ant).

The estimated gimbal angles (θ_est_ant, ϕ_est_ant) can then be used in conjunction with the measured monopulse angles and measured ranges to determine estimated look directions, target locations, missile altitude above targets, etc.

In accordance with the preferred embodiment of the present invention, the estimated gimbal angles θ_est_ant and ϕ_est_ant are found by minimizing the sum of the squares of the Doppler errors $\Delta f\_dop_{nr,nd}$ for all pixels (nr, nd) in the image. This reduces the effects of the random monopulse errors $\mu_{nr,nd}$ and $\nu_{nr,nd}$. Alternatively, the gimbal angles may also be estimated by minimizing the Doppler error for only one pixel, or any number of sampled pixels, without departing from the scope of the present teachings. However, a single pixel by itself may not provide a unique solution and the result of the search will depend on the initial guess made for the angles. This is because the unique minimum that the algorithm seeks as a function of the gimbal angles is caused by the difference between the Doppler cones of the pixels. In selecting a subset of the pixels, it may be desirable to select pixels that are as far apart in the azimuth and elevation angles as possible.

Figure 4:
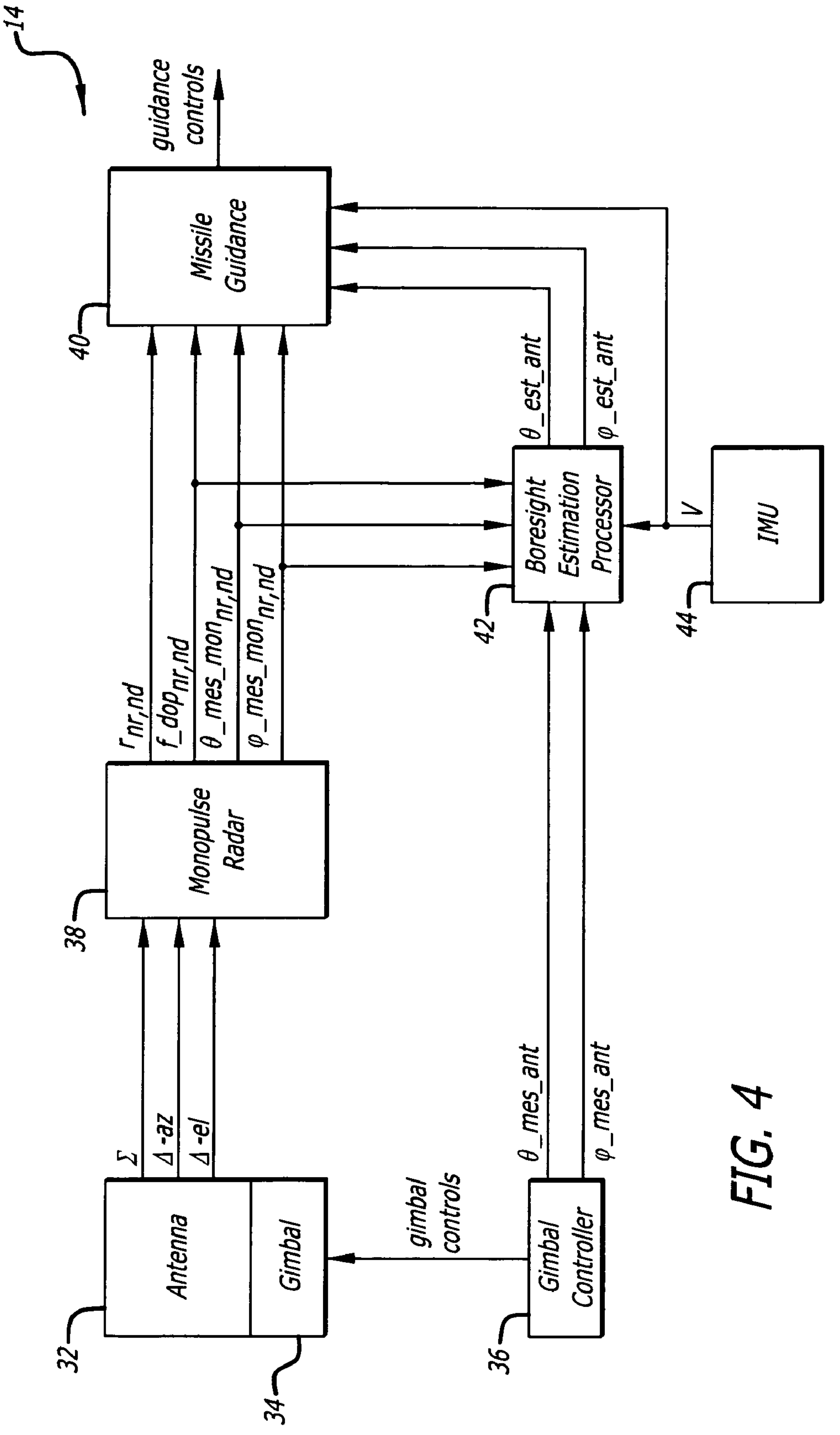
FIG. 4 is a simplified block diagram of a missile seeker designed in accordance with an illustrative embodiment of the present invention.

FIG. 4 is a simplified block diagram of a missile seeker 14 designed in accordance with an illustrative embodiment of the present invention. The seeker 14 includes a radar antenna 32 mounted on a gimbal 34, which is controlled by a gimbal controller 36. The gimbal controller 36 generates control signals for moving the gimbal 34 as directed by the missile guidance system 40. The gimbal controller 36 may also provide the measured (biased) gimbal angle measurements θ_mes_ant and ϕ_mes_ant.

A monopulse radar system 38 generates the signals transmitted by the antenna 32 and processes the signals received by the antenna 32, providing a measured range $r_{nr,nd}$, Doppler $f\_dop_{nr,nd}$, and monopulse direction angles $\theta\_mes\_mon_{nr,nd}$ and $\phi\_mes\_mon_{nr,nd}$ for each of a plurality of pixels (nr, nd). In an illustrative embodiment, the radar 14 is a multi-channel monopulse system, receiving a sum (Σ) channel signal (for measuring range and Doppler), a delta-azimuth (Δ-az) channel signal (for measuring the monopulse azimuth angle), and a delta-elevation (Δ-el) channel signal (for measuring the monopulse elevation angle) from the antenna 32. The radar 38 can also have more or less channels without departing from the scope of the present teachings.

The radar 38 does not need to be a monopulse system. Other techniques for measuring the direction of a received radar return signal relative to antenna boresight may also be used without departing from the scope of the present teachings. Furthermore, in the illustrative embodiment, the radar 38 is a SAR ground imaging radar. The present teachings, however, may also be applied to other types of systems such as other imaging radars, conventional radar, ladar, or other laser-based systems.

In accordance with the present teachings, the missile seeker 14 also includes a boresight estimation processor 42. The boresight estimation processor 42 receives the Doppler $f\_dop_{nr,nd}$ and monopulse angle measurements ($\theta\_mes\_mon_{nr,nd}$, $\phi\_mes\_mon_{nr,nd}$) from the radar 38, the missile velocity V from a missile IMU 44, and, optionally, the biased gimbal angle measurements (θ_mes_ant, ϕ_mes_ant) from the gimbal controller 36, and searches for the optimal estimated gimbal angles (θ_est_ant, ϕ_est_ant) that minimize Doppler error, as described above.

The estimated gimbal angles (θ_est_ant, ϕ_est_ant) and the measured quantities provided by the radar 38 are then used by the missile guidance system 40 to compute the location of the target 16 and generate control signals for guiding the missile 12 to the target 16 (shown in FIG. 1).

Figure 5:
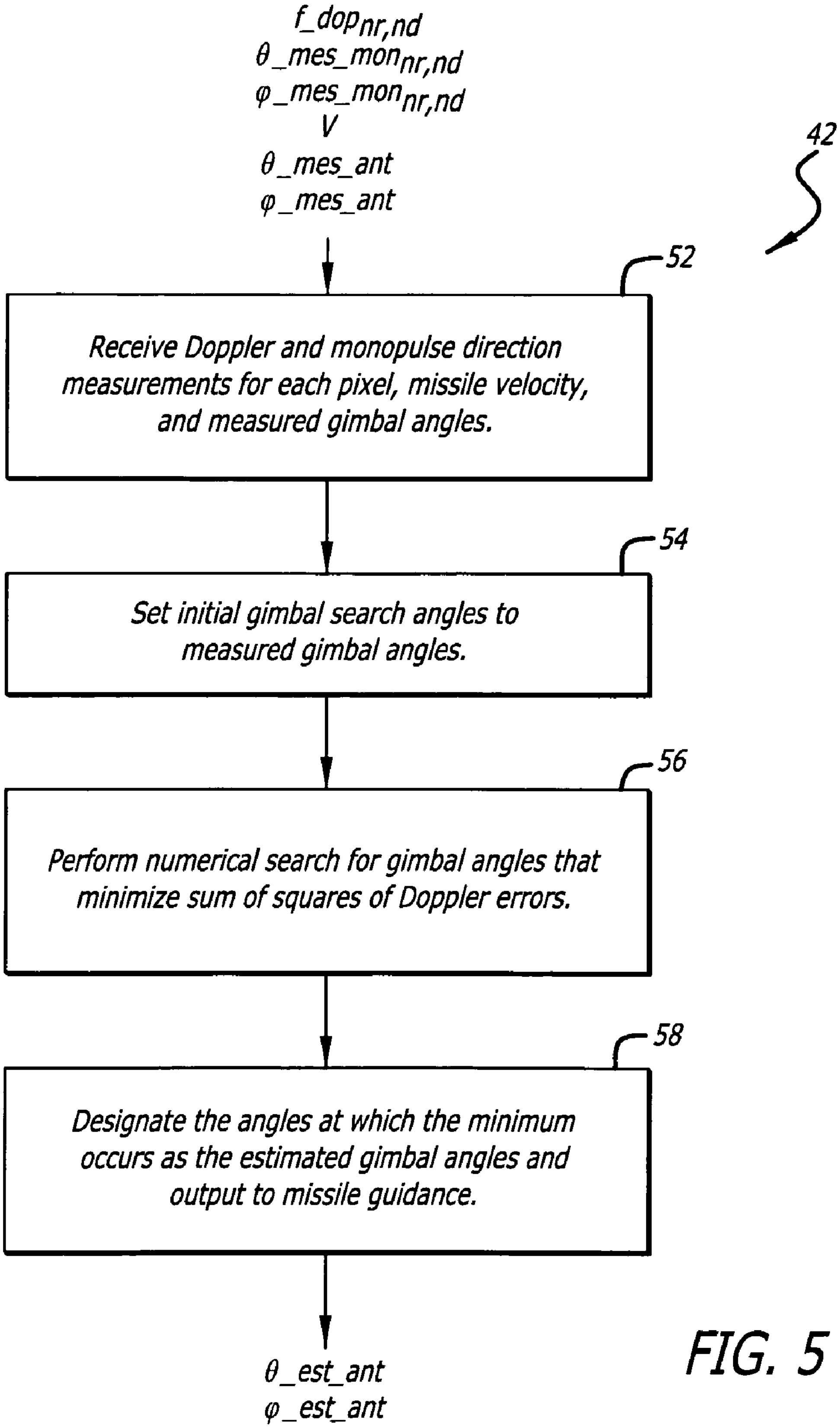
FIG. 5 is a simplified flow diagram of a boresight estimation processor designed in accordance with an illustrative embodiment of the present teachings.

FIG. 5 is a simplified flow diagram of a boresight estimation processor 42 designed in accordance with an illustrative embodiment of the present teachings. First, at Step 52, the boresight estimation processor 42 receives the measured Doppler $f\_dop_{nr,nd}$ for each pixel (nr, nd) and the measurements used for calculating the Doppler for each pixel (nr, nd): the monopulse direction measurements ($\theta\_mes\_mon_{nr,nd}$, $\phi\_mes\_mon_{nr,nd}$) and the missile velocity V.

Optionally, the boresight estimation processor 42 may also receive the biased gimbal angle measurements (θ_mes_ant, ϕ_mes_ant), and at Step 54, set the initial gimbal search angles (θ_ant, ϕ_ant) to the biased gimbal angle measurements (θ_mes_ant, ϕ_mes_ant). Otherwise, the initial guess angles can be set to any predetermined values. In the preferred embodiment, the initial guess angles are set to the biased gimbal angle measurements (θ_mes_ant, ϕ_mes_ant) in order to potentially reduce the time for the search to converge to a solution.

At Step 56, the boresight estimation processor 42 performs a numerical search for the gimbal angles (θ_ant, ϕ_ant) that minimize the Doppler error between the measured Doppler and the calculated Doppler, which is calculated from the gimbal angles (θ_ant, ϕ_ant) and the monopulse direction measurements ($\theta\_mes\_mon_{nr,nd}$, $\phi\_mes\_mon_{nr,nd}$). In the preferred embodiment, the boresight estimation processor 42 searches for the gimbal angles (θ_ant, ϕ_ant) that minimize the sum of the squares of the Doppler errors from each pixel (nr, nd), as described above (using, for example, Eqn. 13).

Finally, at Step 58, the boresight estimation processor 42 designates the angles at which the minimum occurs as the estimated gimbal angles (θ_est_ant, ϕ_est_ant) and outputs these values to the missile guidance system.

The gimbal angle estimation can be performed in real time, during missile flight. The gimbal angles may be estimated only once (e.g., shortly after missile launch), or they may be continuously or periodically updated throughout the missile flight. Because of the effects that the random errors in the measured monopulse angles defined by Eqns. 7 and 8 may have on the estimated target location, it may be desirable to perform periodic updates to improve the estimated gimbal angles and target location. One possibility is to use a Kalman filter in conjunction with these updated estimates.

In an illustrative embodiment, the boresight estimation processor 42 of the present invention is implemented in software executed by a microprocessor. Other implementations may also be used without departing from the scope of the present teachings. For example, the boresight estimation processor 42 may also be implemented using discrete logic circuits, FPGAs, ASICs, etc.

Thus, the present invention has been described herein with reference to a particular embodiment for a particular application. Those having ordinary skill in the art and access to the present teachings will recognize additional modifications, applications and embodiments within the scope thereof. For example, the present teachings have been described above with reference to a missile guidance application. The invention, however, may also be applied to other applications, such as ground mapping or surveillance, without departing from the scope of the present teachings. In addition, the invention has been described with reference to correcting for unknown biases in an antenna gimbal. The present teachings may also be used to correct for errors in other types of antenna pointing systems including, for example, electronically scanned pointing.

It is therefore intended by the appended claims to cover any and all such applications, modifications and embodiments within the scope of the present invention.

Accordingly,

What is claimed is:

1. A system for estimating an antenna boresight direction comprising:

first means for receiving a Doppler measurement and a line-of-sight direction measurement corresponding with said Doppler measurement and second means for searching for an estimated boresight direction that minimizes a Doppler error between said Doppler measurement and a calculated Doppler frequency calculated from said estimated boresight direction and said line-of-sight direction measurement.

2. The system of claim 1 wherein said first means includes means for receiving a Doppler measurement and a line-of-sight direction measurement from each of a plurality of pixels.

3. The system of claim 2 wherein said second means includes means for searching for an estimated boresight direction that minimizes a sum of squares of Doppler errors for each of said pixels.

4. The system of claim 1 wherein said line-of-sight direction measurement is measured relative to a true antenna boresight.

5. The system of claim 4 wherein said calculated Doppler frequency is calculated from a calculated direction found by applying said line-of-sight direction measurement to said estimated boresight direction.

6. The system of claim 5 wherein said antenna is traveling at a velocity V.

7. The system of claim 6 wherein said calculated Doppler frequency is equal to twice the component of said velocity V along said calculated direction, divided by a wavelength λ of a signal transmitted by said antenna to obtain said Doppler and line-of-sight direction measurements.

8. The system of claim 1 wherein said direction measurement is a monopulse direction measurement.

9. The system of claim 8 wherein said estimated boresight direction includes an azimuth angle component and an elevation angle component.

10. The system of claim 1 wherein said direction measurement includes an azimuth angle component and an elevation angle component.

11. The system of claim 1 wherein said system includes means for receiving a measured boresight direction.

12. The system of claim 11 wherein said second means searches for said estimated boresight direction using said measured boresight direction as an initial guess.

13. The system of claim 1 wherein said antenna is mounted on a gimbal having an unknown gimbal bias.

14. The system of claim 1 wherein said Doppler measurement and said line-of-sight direction measurement are measured by a radar that transmits and receives radar signals through said antenna.

15. A system for estimating an antenna boresight direction comprising:

a circuit for receiving a Doppler measurement and a line-of-sight direction measurement for each of a plurality of pixels and a processor adapted to perform a numerical search for an estimated boresight direction that minimizes a sum of squares of Doppler errors for each of said pixels, wherein said Doppler error is a difference between said Doppler measurement and a calculated Doppler frequency calculated from a direction found by applying said line-of-sight direction measurement to said estimated boresight direction.

16. A system comprising:

a gimbal;

an antenna mounted to said gimbal;

a radar adapted to transmit and receive signals through said antenna to measure a Doppler frequency and a monopulse direction for each of a plurality of pixels; and a processor adapted to perform a numerical search for an estimated boresight direction that minimizes a sum of squares of Doppler errors for each of said pixels, wherein said Doppler error is a difference between said measured Doppler frequency and a calculated Doppler frequency calculated from a direction found by applying said monopulse direction measurement to said estimated boresight direction.

17. The system of claim 16 wherein said radar is an imaging radar.

18. The system of claim 16 wherein said radar is a synthetic aperture radar.

19. The system of claim 16 wherein said radar is a multichannel monopulse radar.

20. The system of claim 16 wherein said system is a missile seeker.

21. The system of claim 20 wherein said seeker further includes a missile guidance system.

22. The system of claim 21 wherein said missile guidance system is adapted to calculate a location of a target from said monopulse directions measurements and said estimated boresight direction.

23. A method for estimating an antenna boresight direction including the steps of:

measuring a Doppler frequency and a line-of-sight direction relative to a true antenna boresight for each of a plurality of pixels and searching for an estimated boresight direction that minimizes a sum of squares of Doppler errors for each of said pixels, wherein said Doppler error is a difference between said measured Doppler frequency and a calculated Doppler frequency calculated from a direction found by applying said line-of-sight direction measurement to said estimated boresight direction.

* * * * *